(12) United States Patent
Zettel, II et al.

(10) Patent No.: US 11,423,155 B2
(45) Date of Patent: Aug. 23, 2022

(54) SOFTWARE VULNERABILITY DETECTION IN MANAGED NETWORKS

(71) Applicant: ServiceNow, Inc., Santa Clara, CA (US)

(72) Inventors: Kurt Joseph Zettel, II, Nashville, TN (US); David Victor Barkovic, Mercer Island, WA (US); Richard Kenneth Reybok, Santee, CA (US)

(73) Assignee: ServiceNow, Inc., Santa Clara, CA (US)

( * ) Notice: Subject to any disclaimer, the term of this patent is extended or adjusted under 35 U.S.C. 154(b) by 538 days.

(21) Appl. No.: 16/554,218

(22) Filed: Aug. 28, 2019

(65) Prior Publication Data

US 2021/0064758 A1    Mar. 4, 2021

(51) Int. Cl.
*G06F 21/57* (2013.01)

(52) U.S. Cl.
CPC ...... *G06F 21/577* (2013.01); *G06F 2221/033* (2013.01)

(58) Field of Classification Search
CPC .......................... G06F 21/577; G06F 2221/033
See application file for complete search history.

(56) References Cited

U.S. PATENT DOCUMENTS

| | | | |
|---|---|---|---|
| 5,978,594 A | 11/1999 | Bonnell | |
| 6,321,229 B1 | 11/2001 | Goldman | |
| 6,609,122 B1 | 8/2003 | Ensor | |
| 6,799,189 B2 | 9/2004 | Huxoll | |
| 6,816,898 B1 | 11/2004 | Scarpelli | |
| 6,895,586 B1 | 5/2005 | Brasher | |
| 7,020,706 B2 | 3/2006 | Cates | |
| 7,027,411 B1 | 4/2006 | Pulsipher | |
| 7,028,301 B2 | 4/2006 | Ding | |
| 7,062,683 B2 | 6/2006 | Warpenburg | |
| 7,131,037 B1 | 10/2006 | LeFaive | |
| 7,170,864 B2 | 1/2007 | Matharu | |
| 7,350,209 B2 | 3/2008 | Shum | |
| 7,392,300 B2 | 6/2008 | Anantharangachar | |
| 7,610,512 B2 | 10/2009 | Gerber | |

(Continued)

OTHER PUBLICATIONS

Servicenow, "Madrid Security Incident Management" last updated May 14, 2019.

*Primary Examiner* — Meng Li
(74) *Attorney, Agent, or Firm* — Fletcher Yoder PC

(57) ABSTRACT

A system may include persistent storage containing representations of configuration items discovered in a managed network, where the configuration items include computing devices and software applications installed on the computing devices. One or more processors may be configured to: (i) obtain results of a vulnerability analysis performed on a software application, where the results indicate that the software application exhibits a vulnerability, (i) determine a count of computing devices on which the software application is installed, (iii) calculate a security threat score for the vulnerability, where the security threat score is based on a severity factor of the vulnerability and the count of computing devices, (iv) provide, to a first entity, a first indication of the software application and the vulnerability, and (v) provide, to a second entity, a second indication of the software application, the vulnerability, and the security threat score.

20 Claims, 10 Drawing Sheets

(56) References Cited

U.S. PATENT DOCUMENTS

| | | |
|---|---|---|
| 7,617,073 B2 | 11/2009 | Trinon |
| 7,685,167 B2 | 3/2010 | Mueller |
| 7,689,628 B2 | 3/2010 | Garg |
| 7,716,353 B2 | 5/2010 | Golovinsky |
| 7,769,718 B2 | 8/2010 | Murley |
| 7,783,744 B2 | 8/2010 | Garg |
| 7,877,783 B1 | 1/2011 | Cline |
| 7,890,802 B2 | 2/2011 | Gerber |
| 7,925,981 B2 | 4/2011 | Pourheidari |
| 7,930,396 B2 | 4/2011 | Trinon |
| 7,933,927 B2 | 4/2011 | Dee |
| 7,941,506 B2 | 5/2011 | Bonal |
| 7,945,860 B2 | 5/2011 | Vambenepe |
| 7,966,398 B2 | 6/2011 | Wiles |
| 8,051,164 B2 | 11/2011 | Peuter |
| 8,082,222 B2 | 12/2011 | Rangarajan |
| 8,224,683 B2 | 7/2012 | Manos |
| 8,266,096 B2 | 9/2012 | Navarrete |
| 8,346,752 B2 | 1/2013 | Sirota |
| 8,380,645 B2 | 2/2013 | Kowalski |
| 8,402,127 B2 | 3/2013 | Solin |
| 8,457,928 B2 | 6/2013 | Dang |
| 8,478,569 B2 | 7/2013 | Scarpelli |
| 8,554,750 B2 | 10/2013 | Rangaranjan |
| 8,612,408 B2 | 12/2013 | Trinon |
| 8,646,093 B2 | 2/2014 | Myers |
| 8,674,992 B2 | 3/2014 | Poston |
| 8,683,032 B2 | 3/2014 | Spinelli |
| 8,689,241 B2 | 4/2014 | Naik |
| 8,743,121 B2 | 6/2014 | De Peuter |
| 8,745,040 B2 | 6/2014 | Kowalski |
| 8,812,539 B2 | 8/2014 | Milousheff |
| 8,818,994 B2 | 8/2014 | Kowalski |
| 8,832,652 B2 | 9/2014 | Mueller |
| 8,887,133 B2 | 11/2014 | Behnia |
| 8,907,988 B2 | 12/2014 | Poston |
| 9,015,188 B2 | 4/2015 | Behne |
| 9,037,536 B2 | 5/2015 | Vos |
| 9,065,783 B2 | 6/2015 | Ding |
| 9,098,322 B2 | 8/2015 | Apte |
| 9,122,552 B2 | 9/2015 | Whitney |
| 9,137,115 B2 | 9/2015 | Mayfield |
| 9,239,857 B2 | 1/2016 | Trinon |
| 9,261,372 B2 | 2/2016 | Cline |
| 9,323,801 B2 | 4/2016 | Morozov |
| 9,363,252 B2 | 6/2016 | Mueller |
| 9,412,084 B2 | 9/2016 | Kowalski |
| 9,467,344 B2 | 10/2016 | Gere |
| 9,534,903 B2 | 1/2017 | Cline |
| 9,535,737 B2 | 1/2017 | Joy |
| 9,613,070 B2 | 4/2017 | Kumar |
| 9,631,934 B2 | 4/2017 | Cline |
| 9,645,833 B2 | 5/2017 | Mueller |
| 9,654,473 B2 | 5/2017 | Miller |
| 9,659,051 B2 | 5/2017 | Hutchins |
| 9,710,644 B2 | 7/2017 | Zettel, II |
| 9,766,935 B2 | 9/2017 | Kelkar |
| 9,792,387 B2 | 10/2017 | George |
| 9,805,322 B2 | 10/2017 | Kelkar |
| 9,852,165 B2 | 12/2017 | Morozov |
| 9,967,162 B2 | 5/2018 | Spinelli |
| 10,002,203 B2 | 6/2018 | George |
| 10,158,677 B1 * | 12/2018 | DiCorpo ............... G06F 16/951 |
| 2016/0232358 A1 * | 8/2016 | Grieco ................ G06F 21/577 |
| 2020/0053127 A1 * | 2/2020 | Brotherton ............ H04L 67/10 |
| 2020/0153863 A1 * | 5/2020 | Wiener ............... H04L 63/0421 |
| 2020/0382546 A1 * | 12/2020 | Henderson ............ G06F 40/177 |
| 2021/0037043 A1 * | 2/2021 | Lee .................... H04L 63/1441 |

* cited by examiner

SOFTWARE VULNERABILITY DETECTION IN MANAGED NETWORKS

BACKGROUND

Managed networks may include tens, hundreds, or thousands of individual computing devices, such as personal computers, laptop computers, servers, virtual machines, storage devices, routers, and so on. These components may be geographically distributed across multiple physical locations. As they may contain or provide access to confidential and/or sensitive information, the security of these devices and networks can be important to individuals, groups, and organizations. Thus, vulnerabilities on a managed network (e.g., due to software defects, misconfigurations, etc.) should be addressed with a degree of urgency that is commensurate with the criticality, exposure, exploitability, and spread of the vulnerabilities.

A remote network management platform may be used, in conjunction with a local proxy server application installed on the managed network, to discover and inventory the hardware, software, and services deployed on and provided by the managed network. This data may be stored in the remote network management platform as configuration items. Vulnerability detection tools may be integrated with the remote network management platform so that vulnerabilities found by these tools can be associated with the configuration items.

SUMMARY

The integration of configuration items, as well as vulnerability data regarding these configuration items, into a remote network management platform facilitates new features and functionality not previously available. In particular, custom software applications, developed by an enterprise for use on its managed network, may exhibit vulnerabilities. Such vulnerabilities may be detected (e.g., by software engineering staff) by way of vulnerability detection tools using static or dynamic code analysis. Vulnerabilities may also be detected (e.g., by information technology operations staff) by way of vulnerability detection tools that scan deployed versions of the custom software applications.

In either case, the remote network management platform—possibly in conjunction with vulnerability detection tools—may contain sufficient information to be able to calculate a security threat score for the vulnerability. This score may be based on the severity, exploitability, and/or exposure of the vulnerability, as well as the number of computing devices on which the vulnerability has been found.

Furthermore, the configuration item data may be used to map vulnerabilities found by way of static or dynamic code analysis on custom software applications to specific configuration items impacted, and to notify information technology operations staff accordingly. Conversely, the configuration item data may be used to map vulnerabilities found by way of scanning deployed versions of the custom software applications to specific custom software applications, and to notify software engineering staff accordingly.

Thus, a first example embodiment may involve persistent storage containing representations of configuration items discovered in a managed network, where the configuration items include computing devices deployed within the managed network, software applications installed on the computing devices, and relationship data mapping the software applications to the computing devices on which they are installed. One or more processors may be configured to: (i) obtain results of a vulnerability analysis performed on a software application discovered in the managed network, where the results indicate that the software application exhibits a vulnerability, and where the vulnerability is associated with a severity factor that indicates criticality of the vulnerability, (ii) determine, from the representations of configuration items in the persistent storage, a count of computing devices on which the software application is installed, (iii) calculate a security threat score for the software application having the vulnerability, where the security threat score is at least based on the severity factor of the vulnerability and the count of computing devices, (iv) provide, to a first entity associated with development of the software application, a first indication of the software application and the vulnerability, and (v) provide, to a second entity associated with operation of the managed network, a second indication of the software application, the vulnerability, and the security threat score.

A second example embodiment may involve obtaining results of a vulnerability analysis performed on a software application discovered in a managed network, where the results indicate that the software application exhibits a vulnerability, where the vulnerability is associated with a severity factor that indicates criticality of the vulnerability, where persistent storage contains representations of configuration items discovered in the managed network, and where the configuration items include computing devices deployed within the managed network, software applications installed on the computing devices, and relationship data mapping the software applications to the computing devices on which they are installed. The second example embodiment may also involve determining, from the representations of configuration items in the persistent storage, a count of computing devices on which the software application is installed. The second example embodiment may also involve calculating a security threat score for the vulnerability, where the security threat score is at least based on the severity factor of the vulnerability and the count of computing devices. The second example embodiment may also involve providing, to a first entity associated with development of the software application, a first indication of the software application and the vulnerability. The second example embodiment may also involve providing, to a second entity associated with operation of the managed network, a second indication of the software application, the vulnerability, and the security threat score.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
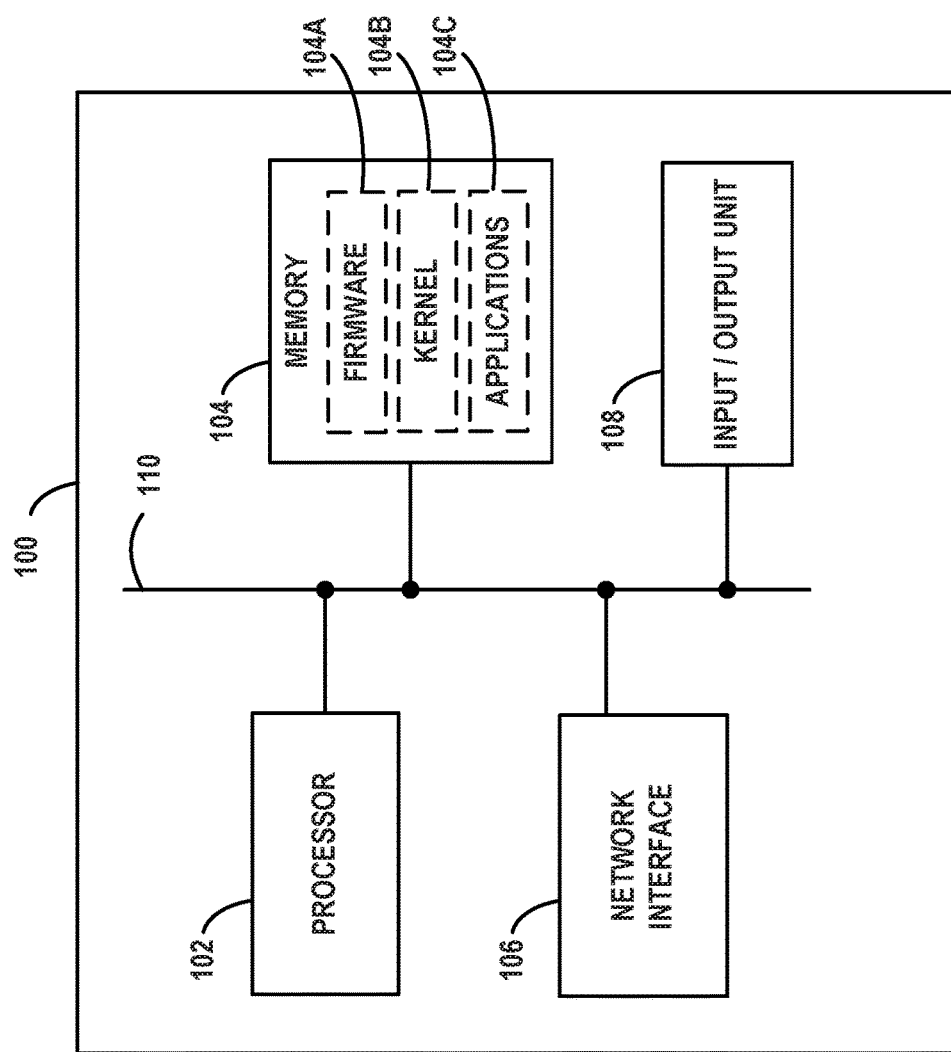
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
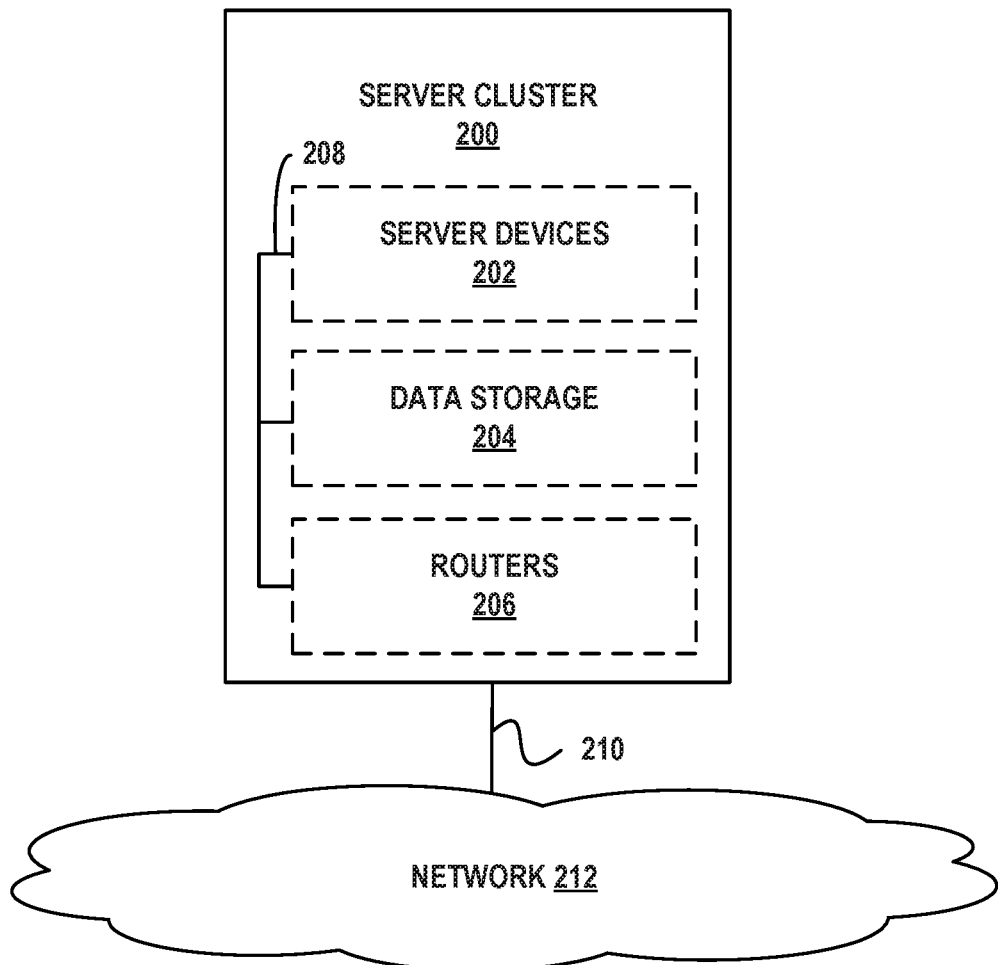
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages.

III. EXAMPLE REMOTE NETWORK MANAGEMENT ARCHITECTURE

Figure 3:
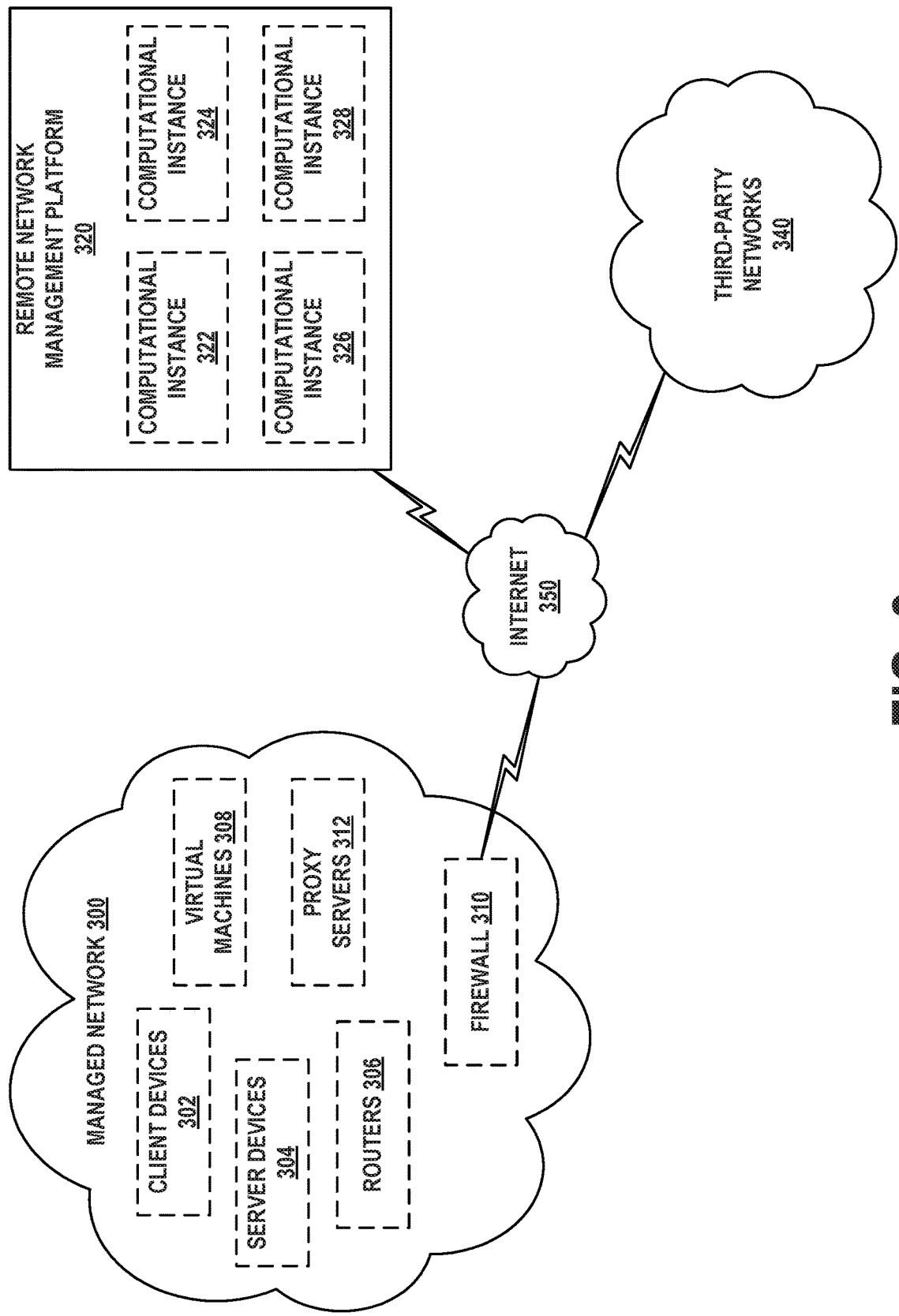
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion.

Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent one or more server devices and/or one or more databases that provide a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows with one or more database tables).

For purpose of clarity, the disclosure herein refers to the physical hardware, software, and arrangement thereof as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of physical or virtual servers and database devices. Such a central instance may serve as a repository for data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® AZURE®. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
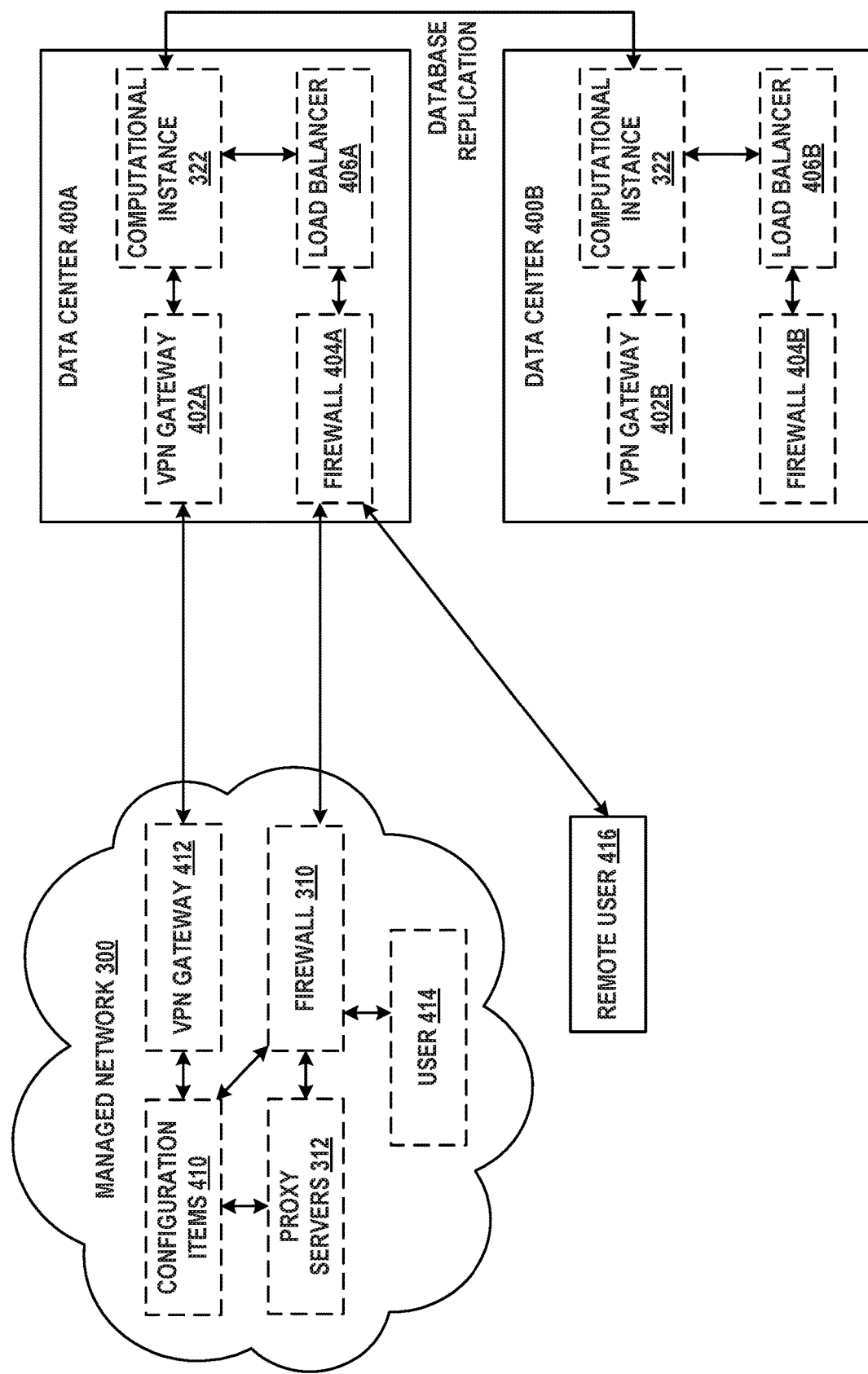
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
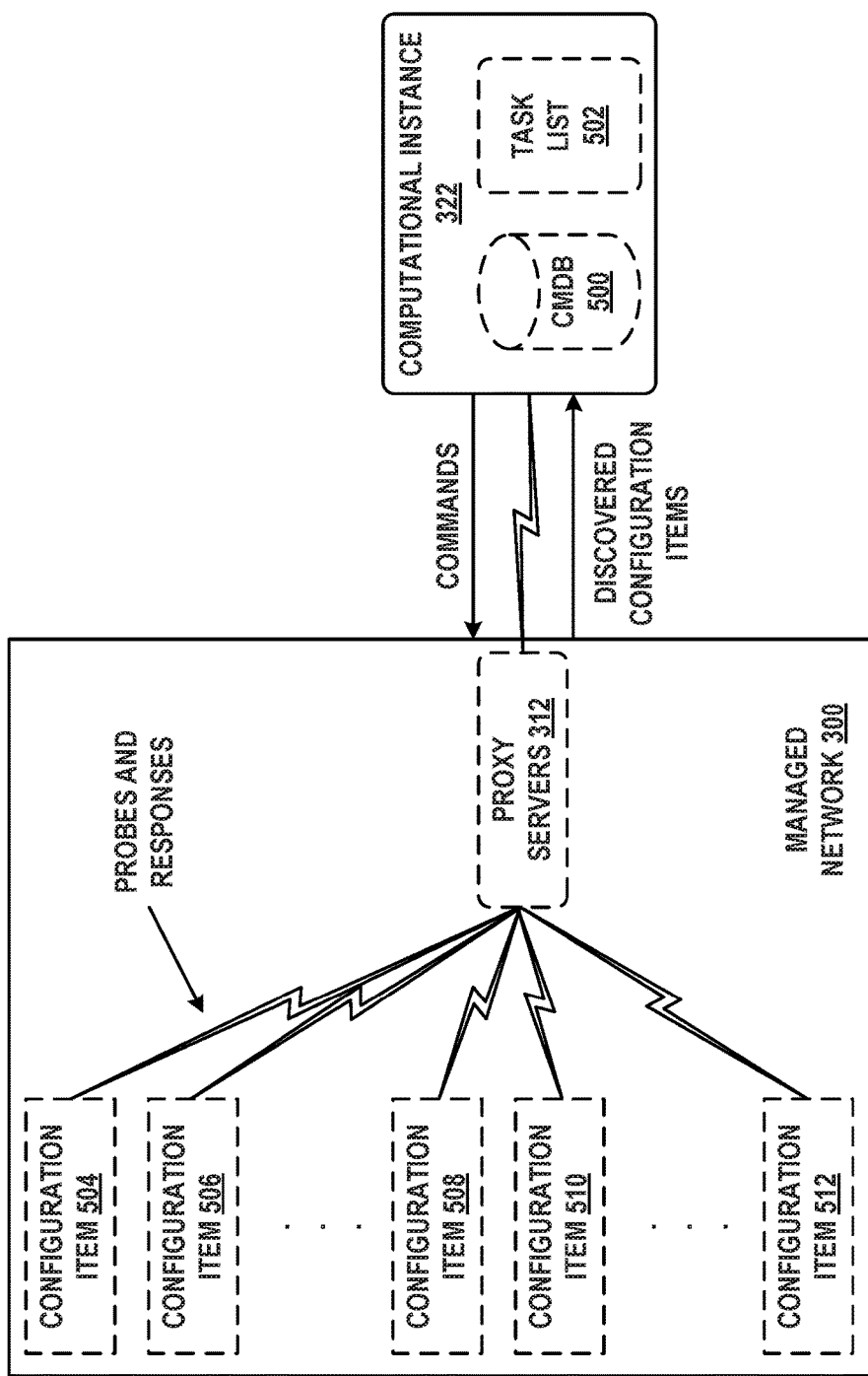
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
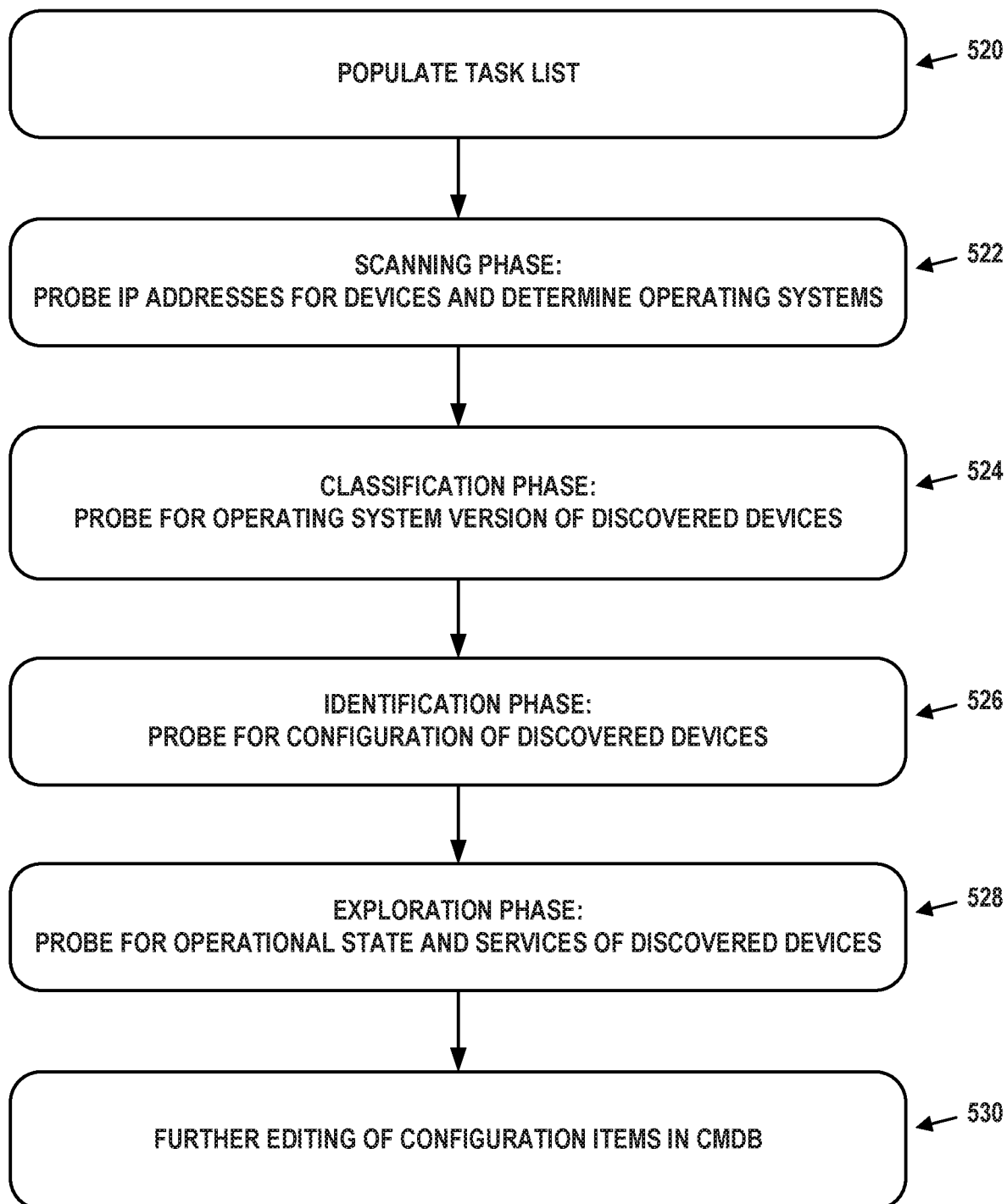
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. EXAMPLE OPERATING ENVIRONMENT

The embodiments herein generally relate to managed networks, operated by enterprises or other entities, that employ a remote network management platform as described above. Thus, the remote network management platform may discover and inventory the hardware, software, and services deployed on and provided by the managed network. This data may be stored in the remote network management platform (e.g., in a CMDB) as configuration items.

A noted above, the configuration items may represent hardware, software, and services deployed on or available by way of the managed network. For example, individual hardware components (e.g., computing devices, virtual servers, databases, routers, etc.) may be represented as hardware configuration items, while the applications installed and/or executing thereon may be represented and software configuration items.

The relationship between a software configuration item installed or executing on a hardware configuration item may take various forms, such as "is hosted on", "runs on" or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

The relationship between a service and one or more software configuration items may also take various forms. As an example, a web service may include a web server software configuration item and a database application software configuration item, each installed on different hardware configuration items. The web service may have a "depends on" relationship with both of these software configuration items, while the software configuration items have a "used by" reciprocal relationship with the web service. Services might not be able to be fully specified by discovery procedures, and instead may rely on service mapping (e.g., probing configuration files and/or carrying out network traffic analysis to determine service level relationships between configuration items) and possibly some extent of manual configuration.

Regardless of how relationship information is obtained, it can be valuable for the operation of a managed network. Notably, IT personal can quickly determine where certain software applications are deployed, and what configuration items make up a service. This allows for rapid pinpointing of root causes of service outages or degradation. For example, if two different services are suffering from slow response times, relationships in the CMDB can be queried to help determine that the root cause is a database application that is used by both services having high processor utilization. Thus, IT personal can address the database application rather than waste time considering the health and performance of other configuration items that make up the services.

A. Example Software Vulnerabilities

The vulnerabilities discussed herein may relate to software applications deployed throughout a managed network. For purposes of this discussion, the "application vulnerabilities" described herein may refer to vulnerabilities found in custom applications developed by and/or specifically for deployment on a particular enterprise's managed network. In contrast, "infrastructure vulnerabilities" may refer to vulnerabilities found in commercial applications, operating systems, and hardware used by the managed network. The differences between custom applications and infrastructure are described in more detail below.

Exploitation of a vulnerability may result in a negative impact to the data confidentiality, integrity and/or availability of one or more applications, services, or computing devices. Examples of common vulnerabilities include SQL injection (e.g., execution of unauthorized SQL code in a database), buffer overflow (e.g., a program writing outside the boundaries of a buffer resulting corrupted data or execution of unauthorized code), and numeric overflow (e.g., writing a value so large to an integer or floating point variable that it is interpreted as a negative number instead, which can lead to unexpected behaviors).

Such vulnerabilities may be associated with different severities. For example, a first hypothetical vulnerability may be that opening a certain type of file in a word processing application provides a remotely-exploitable mechanism through which an attacker can gain access to the computing device on which the word processing application is installed. This would likely be viewed a critical vulnerability, as it could lead to unauthorized access to confidential data. On the other hand, a second hypothetical vulnerability may be that providing certain input to a web browsing application may cause the screen of the computing device on which the web browsing application is installed to go blank. This would likely be viewed as a non-critical vulnerability, as it is a mere annoyance to the user. Severity may be chosen, for example, on a spectrum from critical (most severe), to high, to medium, to low (least severe).

Other factors may also be provided, such as an exploitability factor that indicates how easy or hard the vulnerability is to exploit and/or a discoverability factor that indicates how easy or hard it is for one to discern existence of the vulnerability. Further, an exposure factor may represent how available the vulnerability is to those who might want to exploit it. For example, an Internet-facing device has more exposure to vulnerabilities than a device internal to a managed network. Additional factors may be used.

It should be noted that vulnerabilities are not the same as active security threats. Vulnerabilities indicate that a problem has been identified independent of whether the vulnerability has been actually exploited. Active security threats, on the other hand, are ongoing exploitations that often require immediate attention. For example, a live distributed denial of service (DDOS) attack should be addressed in real time, regardless of whether any vulnerabilities that it uses are known.

Thus, software developers and IT professionals address vulnerabilities as time allows based on their severities and other factors. Critical severity vulnerabilities may be targeted for resolution within 30 days, for example, while high severity vulnerabilities may be targeted for resolution within 90 days, and so on. Vulnerabilities with lower-level severities may be addressed on an as-time-permits basis or might not be scheduled for resolution at all, as these non-critical vulnerabilities may be deemed low enough risk that security managers should be spending their time carrying out more important tasks instead.

Addressing a vulnerability may occur in various ways. In the case of software applications, the individual or group associated with developing the application with the vulnerability may produce an installable patch or a new version of the software application that resolves the vulnerability. Alternatively, the individual, group, or another party may identify a workaround to the vulnerability, such as settings that mitigate or prevent the vulnerability from occurring. In some cases, IT professionals may disable software applications with unpatched vulnerabilities or issue warnings to users until a patch, new version, or workaround is available. In extreme situations, vulnerable software applications may be temporarily or permanently removed from impacted computing devices.

Nonetheless, once a resolution is available, IT professionals may schedule the resolution to be applied in accordance with the severity (and possibly other factors) of the vulnerability. For example, the IT professionals may schedule a patch to be pushed out to impacted computing devices once the patch is available.

B. Example Vulnerability Detection Tools

In order to locate vulnerabilities, vulnerability detection tools—software that scans applications, devices, or networks seeking evidence of known vulnerabilities—may be used. For purposes of this discussion, vulnerability detection tools are divided into three types—those that perform static code analysis, those that perform dynamic code analysis, and those that operate against deployed applications. In various embodiments, other types of vulnerability detection tools may be used, including those that involve two or all three of these techniques.

Static code analysis involves attempting to detect vulnerabilities in application code (with the emphasis herein being on custom application code) without actually executing the code. Static code analysis is usually performed on source code, but sometimes can be performed on object or executable code as well. Techniques used in static code analysis include abstract interpretation (e.g., modeling the code as a state machine approximation of its functions and determining the effect that each statement in the code has on this state machine), data flow analysis (e.g., determining the impact that each block of code has on the program), Hoare logic (e.g., modeling units of code with their respective pre-conditions and post-conditions to determine program behavior), and symbolic execution (e.g., simulating execution of the program to determine what input causes parts of the program to execute) among others. Example vulnerability detection tools that use static code analysis include those from VERACODE®, FORTIFY®, and WHITEHAT®, among others.

Dynamic code analysis, on the other hand, involves examining an application (e.g., a custom application) while it is executing or its execution is being simulated. Before this, the application may be instrumented to facilitate the analysis, and a set of inputs that provide sufficient coverage of all possible inputs may be identified. These inputs may be integrated into test cases that are applied to the application. With the instrumentation and the set of inputs, a dynamic code analysis tool may be able to detect memory errors (e.g., out of bounds accesses, memory leaks), race conditions, and localize defects by examining which test cases fail and which pass. Dynamic code analysis tools include VERACODE® and APPSCAN®.

Vulnerability scanners probe deployed applications for versions with known defects or unpatched versions deployed on the managed network. Some vulnerability scanners may also detect misconfigurations (e.g., open mail relays), weak passwords, unnecessary open TCP or UDP ports, and other issues that may be specified to a particular version of the application. These scanners may employ vulnerability databases to perform numerous tests on each application, and may also support scripting languages that permit customized vulnerability probing. Example vulnerability scanners include NESSUS®, QUALYSGUARD®, and RAPID7®.

As is described in more detail below, the output of any of these vulnerability detection tools can be integrated with data from the CMDB to detect the overall security threat score of each vulnerability.

C. Commercial and Custom Software Applications

For purposes of clarity, this disclosure divides software applications deployed on a managed network into two broad categories: "commercial" and "custom." Commercial applications may also be referred to as infrastructure applications or third-party applications, and custom applications may also be referred to as homegrown or first-party applications.

Commercial software applications are typically acquired from third-parties and deployed on the managed network. Examples include office productivity, database, web server, email, photo editing, and software development applications just to name a few. These applications may be installed and execute on one or more hardware configuration items of the managed network. Further, these applications may also be discovered as software configuration items. Relationships between applications, services, and hardware configuration items may also be represented in a CMDB. Commercial applications are usually deployed as executable code or object code (e.g., machine code or byte code), and the managed network might not have access to the source code thereof.

Custom software applications are typically developed as a whole or in part for exclusive use by the managed network. For example, an enterprise may determine that it needs to have a custom IT, HR, or accounting application developed, and may have software engineering personnel develop and maintain such an application. Thus, the managed network has access to not only object or executable versions of custom applications, but their source code as well. Like commercial applications, custom applications may be discovered and their relationships mapped to services and hardware configuration items.

In some environments, a hybrid of custom and commercial application may be possible. Some commercial applications allow modification of their source code directly (e.g., open source applications), or may facilitate new features through a plugin architecture. Thus, software engineering personnel may develop new source code that can be compiled or otherwise integrated into a commercial application. For purposes of this disclosure, such hybrid applications can be considered to be custom applications as well.

The focus herein is on detecting vulnerabilities in custom applications. That is, using vulnerability detection tools to determine whether source or executable code specifically developed by or for use on a managed network has any vulnerabilities, and providing results from these vulnerability detection tools to a database (e.g., the CMDB for the managed network) within the remote network management platform.

Conversely, a vulnerability detection tool that scans a custom application installed on one or more computing devices of the managed network (along with other applications, the operating system, database software, and utilities for example) may discover a vulnerability therein and provide a report of the vulnerability to the remote network management platform (e.g., written to the CMDB or another database in the remote network management platform).

Since the CMDB has—or at least is expected to have—a comprehensive listing of hardware configuration items disposed within the managed network, the overall security threat score of a vulnerability can be rapidly identified. For instance, a vulnerability that is in a software application installed on just one computing device may be associated with a low overall security threat score even if the vulnerability has high severity. On the other hand, a vulnerability of moderate severity can have a high security threat score if the software that it is found in is installed on hundreds or thousands of computing devices in the managed network. Other factors described above—exploitability, whether an exploit is publicly known, and exposure to the Internet, for example—may also be taken into account.

In either of these cases, the remote network management platform may proactively notify (i) the software engineering department of the managed network so that it is aware of the vulnerability and can take the appropriate steps to address the vulnerability (e.g., revising the source code and providing a patch to the custom application), and (ii) the IT department of the managed network so that it is also aware of the vulnerability and can determine how and when to apply the patch to impacted configuration items.

The ability to determine the security threat score of a custom application based on CMDB data is a significant improvement in vulnerability detection technology. Without a CMDB mapping software applications to computing devices on which they are installed, an IT professionals may not be able to determine how widely spread the vulnerability is in the managed network. Since IT professionals are often busy addressing multiple known vulnerabilities and other issues at any point in time, the ability to prioritize their work based on security threat score is important.

Furthermore, the embodiments described above allow vulnerability information to flow in two directions within an organization. Software engineers in an enterprise may use static or dynamic code analysis tools to identify vulnerabilities in their applications that are deployed in the enterprise's managed network. This information is provided to the remote network management platform, and the security threat score of identified vulnerabilities can be assessed and reported to the enterprise's IT professionals. Likewise, the IT professionals may use vulnerability scanners on applications deployed in the managed network. This information is provided to the remote network management platform, and the security threat score of identified vulnerabilities can be assessed and reported to the software engineers.

Figure 6:
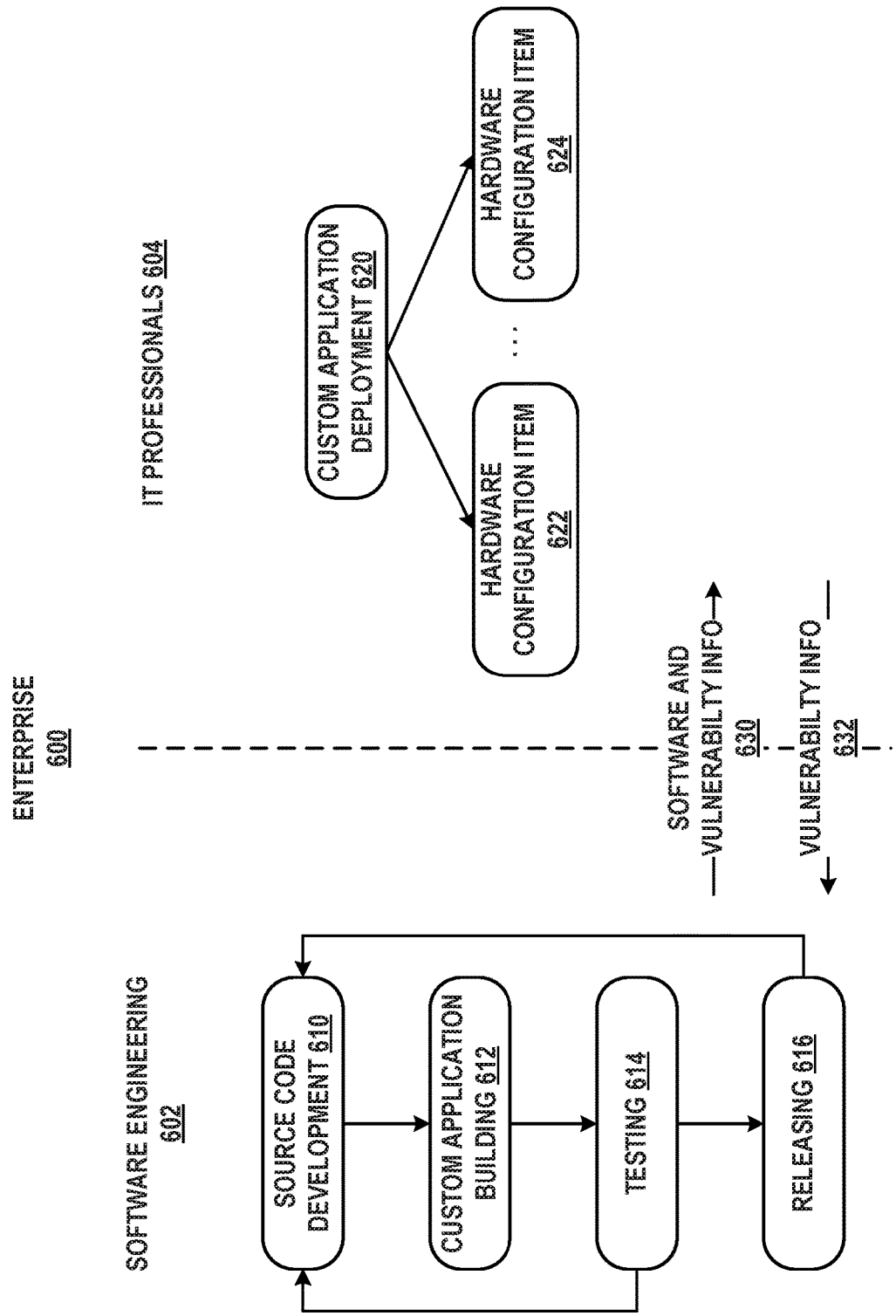
FIG. 6 depicts roles and vulnerability information flow between these roles, in accordance with example embodiments.

FIG. 6 provides a logical depiction of these procedural aspects related to custom application development, deployment thereof, and identifying associated vulnerabilities. Particularly, enterprise 600 operates a managed network and includes software engineering 602 and IT professionals 604. Software engineering 602 may be an individual, group, or department that develops custom applications for IT professionals 604, which in turn deploy the custom applications to the managed network.

An example development procedure for software engineering 602 may include phases of: source code development 610, custom application building 612 (e.g., compiling the source code to executable or object code and integrating it with other assets such as images, audio, or video), testing 614 (verifying that the software application does what it is supposed to do in the manner intended), and releasing 616 (providing the software application to IT professionals 604 for deployment on the managed network).

As indicated by the arrow from testing 614 to source code development 610, phases 610, 612, and 614 may be repeated some number of times until software engineering 602 is satisfied that the software application is ready for release. Further, as indicated by the arrow from releasing 616 to source code development 610, phases 610, 612, 614, and 616 may also repeat some number of times in order to address defects found after release as well as to add new features to the software application.

Regardless, at some point, software engineering 602 hands off the custom application to IT professionals 604, as indicated by arrow 630. Then, IT professionals 604 engage in custom application deployment 620, which may involve installing the custom application on some number of hardware configuration items, such as hardware configuration items 622 and 624.

Under the model depicted in FIG. 6, vulnerability information can flow in either or both directions between software engineering 602 and IT professionals 604, as indicated by arrows 630 and 632.

In one possible scenario, a custom application is developed by software engineering 602 and deployed on the managed network. At some point after this deployment, software engineering 602 may use a vulnerability detection tool to determine that there is a vulnerability in the custom application, and notify IT professionals 604. Alternatively, IT professionals 604 may use the same or a different vulnerability detection tool to determine that there is a vulnerability in a deployed custom application, and notify software engineering 602.

In some cases, one or more vulnerability detection tools may be integrated to some extent with the remote network management platform. In these cases, the remote network management platform may receive output from a vulnerability detection tools, and store the output in a database (e.g., the CMDB or another database). The remote network management platform may calculate security threat scores associated with vulnerabilities identified in this output based on assessments from the vulnerability detection tools as well as configuration item information from the CMDB, and then notify the appropriate parties of these vulnerabilities.

VI. EXAMPLE VULNERABILITY MANAGEMENT ARCHITECTURE

Figure 7:
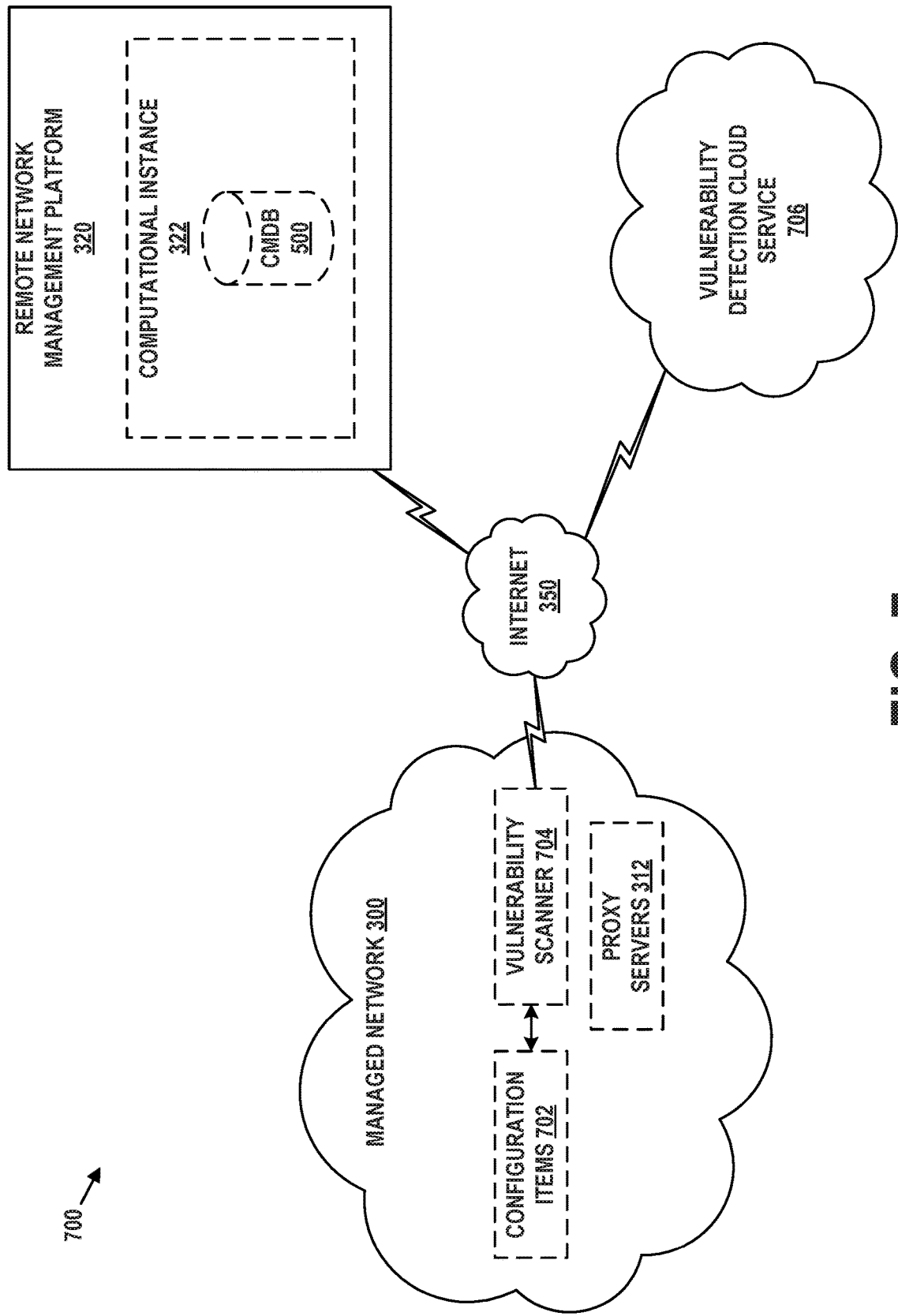
FIG. 7 depicts a communication environment involving a remote network management platform, managed network, and a vulnerability detection cloud service, in accordance with example embodiments.

FIG. 7 depicts a vulnerability management architecture 700. Architecture 700 is a variation of that of FIG. 3, but focuses on vulnerability management. Thus, architecture 700 includes managed network 300, remote network management platform 320, and vulnerability detection cloud service 706, all connected by Internet 350.

Managed network 300 is largely the same as shown in FIG. 3, but just showing configuration items 702, vulnerability scanner 704, and proxy servers 312. Each of configuration items 702 may represent a virtual or physical computing device and/or a software application installed upon such a computing device. Vulnerability scanner 704 may be a dedicated unit of software and/or a virtual or physical computing device that is deployed within managed network 300 to detect vulnerabilities relating to configuration items 702. Proxy servers 312 may take on the same or similar functionality as described above.

In some embodiments, vulnerability scanner 704 may include a software agent that is deployed on multiple endpoints, where endpoints are represented within one or more of configuration items 702. In these or other embodiments, vulnerability scanner 704 may include one or more software applications deployed on one or more dedicated computing devices. In either situation, vulnerability scanner 704 may scan or otherwise remotely access configuration items 702 to detect vulnerabilities. For example, vulnerability scanner 704 may scan configuration items 702—e.g., probe for open TCP/IP ports on computing devices, and/or log on to computing devices to determine the operating system, software applications installed thereon, and versions thereof. In some embodiments, vulnerability scanner 704 may store the results of these scans locally, or may transmit the results to vulnerability detection cloud service 706. Thus, the combination of vulnerability scanner 704 and vulnerability detection cloud service 706 may make up what has been referred to herein as a vulnerability detection tool.

Remote network management platform 320 is the same or similar to that of FIG. 3, but showing only one computational instance, computational instance 322, for sake of simplicity. Computational instance 322 includes CMDB 500. As described above, CMDB 500 may include representations of configuration items 702, including multiple attributes for each.

Vulnerability detection cloud service 706 is an optional component that might not be present when vulnerability scanner 704 stores the results of scans locally. However, when present, vulnerability detection cloud service 706 receives these results, and may store and assess the results. For instance, vulnerability detection cloud service 706 may identify vulnerabilities based on the operating system and version thereof, operating system configuration, software application and version thereof, software configuration, and possible other metrics as well. The identified vulnerabilities may be stored and then made available by way of an interface, such as a web-based graphical user interface, a JavaScript Object Notation (JSON) interface, an XML interface, or some other form of interface.

In particular, computational instance 322 may be configured to obtain the identified vulnerabilities from vulnerability detection cloud service 706, or from vulnerability scanner 704 directly or by way of proxy servers 312. As discussed in more detail below, computational instance 322 may combine this information with additional information from CMDB 500 to provide an overall security threat score per vulnerability. These security threat scores may be used to prioritize how security managers of managed network 300 address vulnerabilities. For custom applications, these security threat scores may also be used to prioritize how software engineers of managed network 300 address vulnerabilities.

Figure 8:
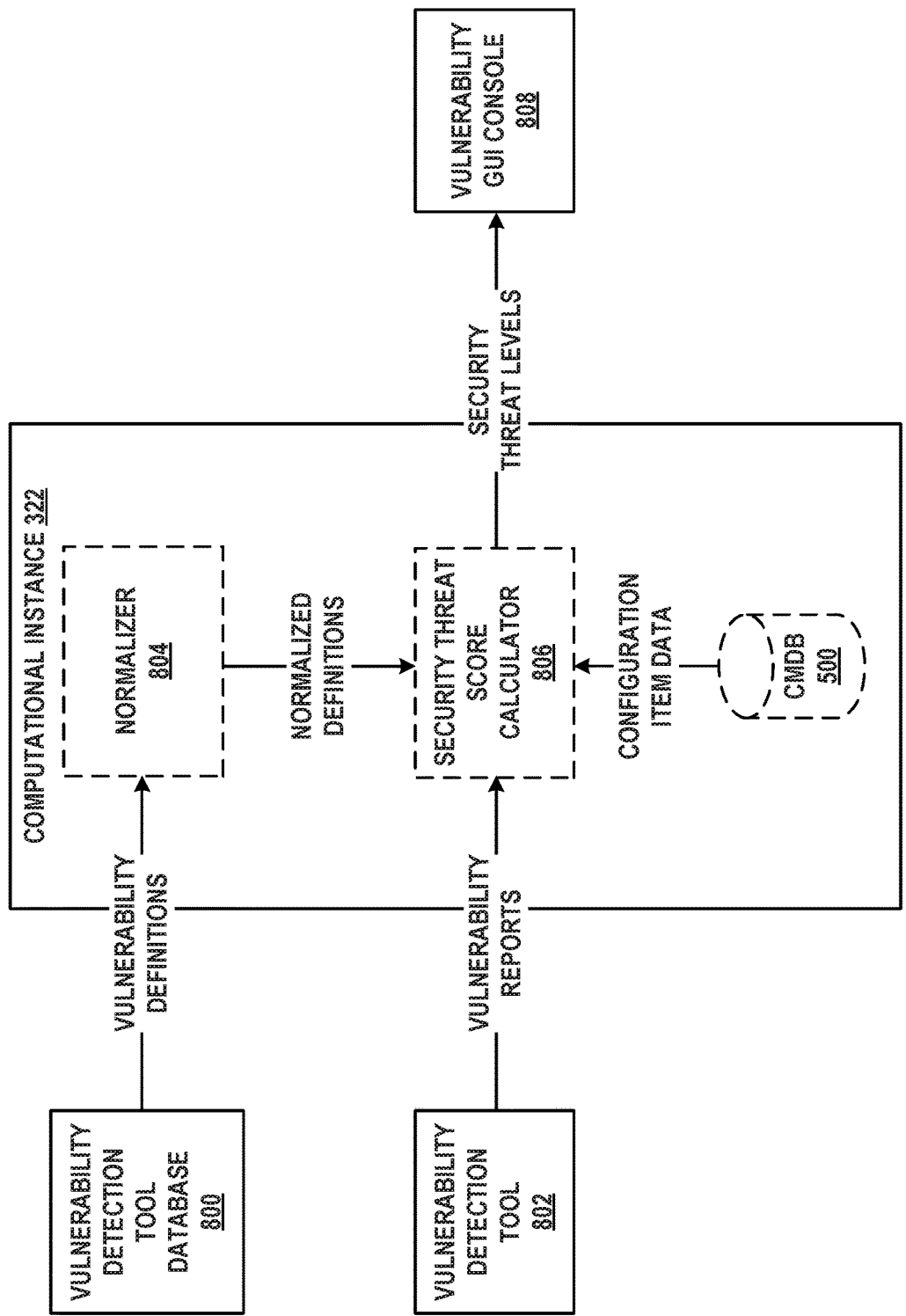
FIG. 8 depicts a vulnerability data flow, in accordance with example embodiments.

FIG. 8 provides further aspects of these procedures. Vulnerability detection tool database 800 contains definitions of vulnerabilities, which may include a severity and/or an exploitability ranking for each known vulnerability. Vulnerability detection tool database 800 may incorporate or be based on a governmental or commercial database.

Normalizer 804 of computational instance 322 may obtain the vulnerability definitions from vulnerability detection tool database 800. Normalizer 804 may then map these definitions to normalized definitions used by computational instance 322. This normalization may be desirable if at least some third-party vulnerability databases use different scales to evaluate the severity and/or exploitability of vulnerabilities or use different database schema altogether. For example, computational instance 322 may use a vulnerability severity scale (from most severe to least severe) of critical, high, medium, low, and none, while third-party database may use a vulnerability severity scale (from most severe to least severe) of important, moderate, and optional. Normalizer 804 may be configured to convert the vulnerability definitions from vulnerability detection tool database 800 to the normalized definitions by, for instance, mapping important severities to critical severities, moderate severities to medium severities, and optional severities to low severities. Other severity mappings may be possible and similar mappings may exist for the exploitability scales. Thus, normalizer 804 may be configured to normalize definitions from multiple sources.

Once the vulnerability definitions are normalized, they are provided to security threat score calculator 806. Security threat score calculator 806 also obtains vulnerability data regarding a managed network (e.g., managed network 300) from vulnerability detection tool 802. As noted above, computational instance 322 may retrieve this data from a managed network or from vulnerability detection cloud service 706. This vulnerability data may identify or refer to, for each vulnerability identified in the managed network, a severity rating, an exposure rating, and/or an exploitability rating for the vulnerability, as well as references to the configuration items impacted by the vulnerability. Security threat score calculator 806 may use the normalized definitions to map the severity and/or exploitability ratings from the vulnerability data to their normalized values.

In order to ensure that software and hardware configuration items are referred to in a consistent fashion between CMDB 500 and vulnerability detection tool 802, the remote network management platform may include mapping rules that allow hardware configuration items to be mapped to data referring to the same computing devices in the vulnerability data. For example, if the vulnerability data refers to computing devices by their IP addresses, a mapping rule may indicate that IP address is a field that can be used to match the vulnerability data to the hardware configuration items in CMDB 500. In some cases, mappings may be based on domain names, MAC addresses, unique identifiers assigned to computing devices by the enterprise, or some combination thereof. In some embodiments, these rules may specify tables and/or fields within CMDB 500 that can be used to find this information.

Security threat score calculator 806 may also obtain information from CMDB 500 regarding the importance of configuration items impacted by the vulnerability. For example, a publicly-accessible web server and the computing device on which it operates may be designated with high importance, while a client device used in a lab environment may be designated with low importance. The higher the importance of a configuration item impacted by a vulnerability, the more precedence should be given to addressing this vulnerability.

Security threat score calculator 806 may also obtain information from CMDB 500 regarding the exposure of the configuration items impacted by the vulnerability. For example, an Internet-facing device has more exposure to vulnerabilities than a device internal to a managed network. Thus, Internet-facing devices impacted with a vulnerability should be addressed with higher priority than internal devices with the same vulnerability.

Additionally, security threat score calculator 806 may take into account the exploitability of the vulnerability, as indicated by the normalized definitions and/or the vulnerability data. For example, a vulnerability that requires a low level of skill to be exploited should be addressed with higher priority than a vulnerability that requires a high level of skill to be exploited.

From this input, security threat score calculator 806 provides security threat scores for each combination of vulnerability and configuration item. The combination of a vulnerability found on a configuration item and that configuration item may be referred to a vulnerable item. Thus, a security threat score per vulnerable item is produced. For instance, if a computing device is subject to two vulnerabilities or multiple computing devices are subject to the same vulnerability, one security threat score per each of these vulnerable items is provided.

The security threat score may be calculated in various ways from the vulnerability severity, vulnerability exploitability, and vulnerability exposure factors. Additional factors from vulnerability detection tool database 800 and/or CMDB 500 may also be used. For instance, each discrete value for vulnerability severity, vulnerability exploitability, and vulnerability exposure may map to a number, and the security threat score may be calculated as a weighted sum of these numbers. Further, the security threat score may be calculated so that it is within a given range (e.g., 0.0 to 1.0, where 0 indicates no risk and 1.0 indicates the highest level of risk).

As an example, security threat score (STS) may be determined using the equation $$STS = w_E E + w_S S + w_X X$$

where E represents exploitability, S represents severity, and X represents exposure, and each of these variables take on values between 0.0 and 1.0 inclusive. Further, the sum of all weights ($w_E + w_S + w_X$) is 1.0, resulting in STS also being between 0.0 and 1.0 inclusive. But other calculations are possible. For example, where E, S, and X are all between 0.0 and 1.0 inclusive, a multiplicative equation may be used instead:

$$STS = E \times S \times X$$

In some embodiments, the security threat score may be modified by the spread the vulnerability. This may be the count of hardware configuration items on which the software application with the vulnerability is deployed. The modification may involve applying a logarithmic growth curve to the security threat score. As an example, one possible embodiment may calculate a partial sum of the harmonic series to approximate logarithmic growth curve. Particularly, for a vulnerability deployed on n hardware configuration items, this modifier, M, may be expressed as $$M = \sum_{i=1}^{n} \frac{1}{i}$$

Then, M may be used to scale the calculated security threat score. For example, this can take the form of $$STS = M(w_E E + w_S S + w_X X)$$

or $$STS = M(E \times S \times X)$$

Under these assumptions, the value of STS can exceed 1.0 when M is greater than 1. Regardless, other equations can be used for these purposes.

Furthermore, a security threat score may be calculated for a service that uses multiple software and/or hardware configuration items as an amalgam of vulnerabilities on these configuration items. For example, this service-level security threat score may be based on an additive or logarithmic function of the security threat scores of the individual vulnerabilities. Again, relationship data in CMDB 500 may be used to identify a service and determine its constituent configuration items. In some scenarios, a configuration item with known vulnerabilities in its operating system and/or commercial applications, combined with vulnerabilities in its custom applications, can result in a higher security threat score due to the ability of attackers to attempt to exploit multiple vulnerabilities.

Each vulnerability may be associated with a software engineering individual or group and/or an IT professional individual or group. These users or groups may have accounts on the remote network management platform. Thus, the remote network management platform may notify the associated parties of detected vulnerabilities and the security threat scores of these vulnerabilities. In some cases, such a notification may take the form of an email, text message, or phone call. In other case, security threat scores may be displayed in vulnerability graphical user interface console 808 and used by software engineers and IT professionals to prioritize the vulnerabilities that they address.

VII. EXAMPLE OPERATIONS

Figure 9:
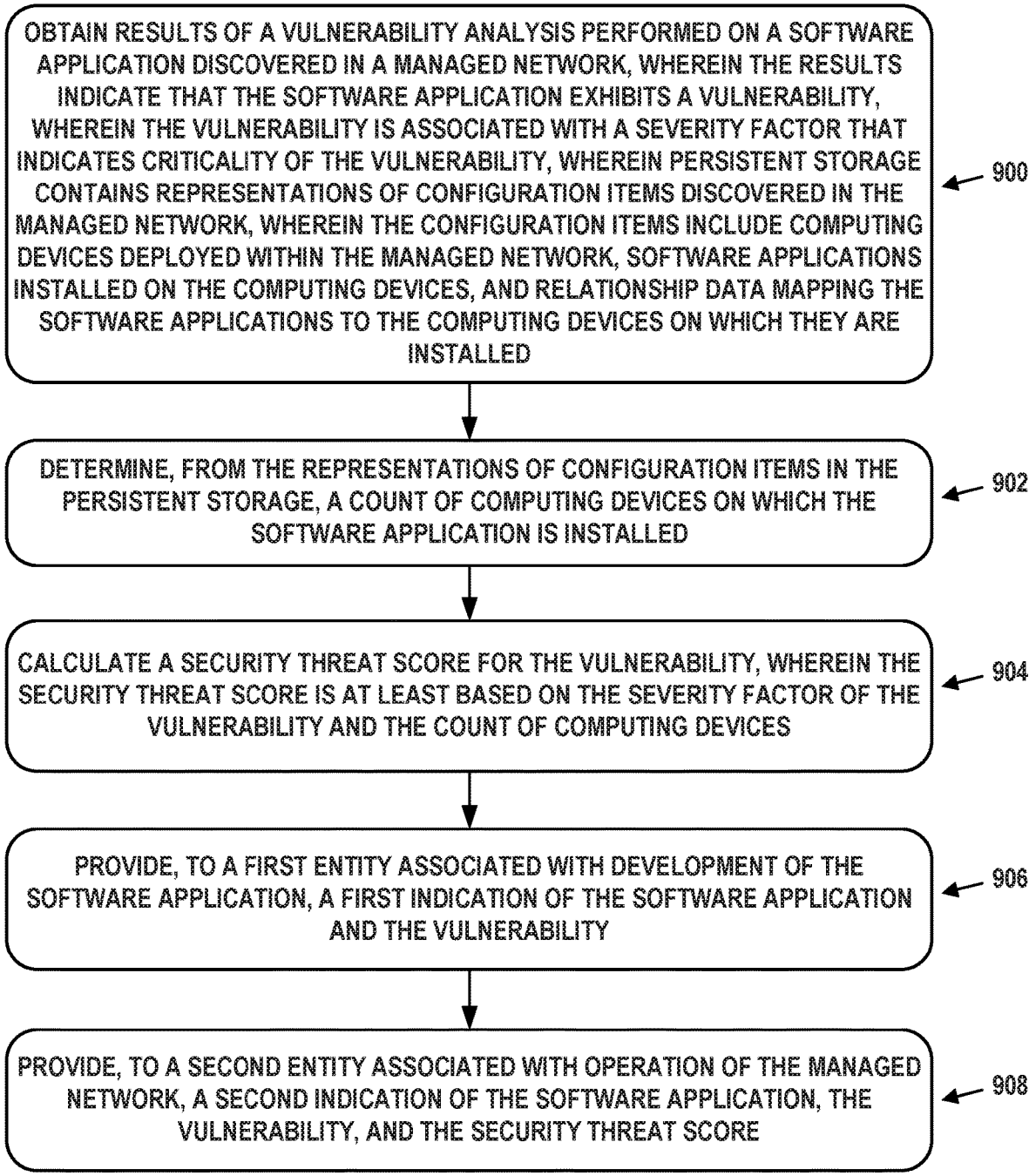
FIG. 9 is a flow chart, in accordance with example embodiments.

FIG. 9 is a flow chart illustrating an example embodiment. The process illustrated by FIG. 9 may be carried out by a computing device, such as computing device 100, and/or a cluster of computing devices, such as server cluster 200 disposed within a remote network management platform. However, the process can be carried out by other types of devices or device subsystems.

The embodiments of FIG. 9 may be simplified by the removal of any one or more of the features shown therein. Further, these embodiments may be combined with features, aspects, and/or implementations of any of the previous figures or otherwise described herein.

Block 900 may involve obtaining results of a vulnerability analysis performed on a software application discovered in a managed network, where the results indicate that the software application exhibits a vulnerability, where the vulnerability is associated with a severity factor that indicates criticality of the vulnerability, where persistent storage contains representations of configuration items discovered in the managed network, and where the configuration items include computing devices deployed within the managed network, software applications installed on the computing devices, and relationship data mapping the software applications to the computing devices on which they are installed.

Block 902 may involve determining, from the representations of configuration items in the persistent storage, a count of computing devices on which the software application is installed. For instance, the relationship data may be used to map the software application to computing devices on which it is installed or otherwise operational.

Block 904 may involve calculating a security threat score for the vulnerability, where the security threat score is at least based on the severity factor of the vulnerability and the count of computing devices.

Block 906 may involve providing, to a first entity associated with development of the software application, a first indication of the software application and the vulnerability.

Block 908 may involve providing, to a second entity associated with operation of the managed network, a second indication of the software application, the vulnerability, and the security threat score.

In some embodiments, obtaining results of the vulnerability analysis performed on the software application comprises obtaining results of a static or dynamic code analysis performed on source or object code of the software application, where the static or dynamic code analysis is performed by a third-party vulnerability detection tool that is integrated with a remote network management platform that is associated with the managed network.

In some embodiments, obtaining results of the vulnerability analysis performed on the software application comprises obtaining results of a vulnerability scan of the software application as deployed in the managed network, where the vulnerability scan is performed by a third-party vulnerability detection tool that is integrated with a remote network management platform that is associated with the managed network.

In some embodiments, the vulnerability is also associated with an exploitability factor that indicates a skill level required to exploit the vulnerability, where the security threat score is also based on the exploitability factor.

In some embodiments, security threat score is also based on an exposure factor that represents ease of access to exploiting the vulnerability.

In some embodiments, the security threat score is scaled by a multiplicative factor representing a logarithmic function that grows with the count of computing devices. The logarithmic function may be based on a partial sum of a harmonic series up to the count of computing devices.

In some embodiments, the security threat score is also provided to the first entity.

In some embodiments, the first indication and the second indication take a form of email, text message, telephone call, or web-based graphical user interface.

Some embodiments may further involve calculating a service-level security threat score for a networked service provided by the managed network, where the networked service involves the software application having the vulnerability, where the networked service is defined by a set of the configuration items and relationships therebetween as indicated by the relationship data, and where the service-level security threat score is based on severity factors associated with the set of the configuration items.

VIII. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
   persistent storage containing representations of configuration items discovered in a managed network, wherein the configuration items include computing devices deployed within the managed network, software applications installed on the computing devices, and relationship data mapping the software applications to the computing devices on which they are installed; and
   one or more processors configured to:
      obtain results of a vulnerability analysis performed on a software application discovered in the managed network, wherein the results indicate that the software application exhibits a vulnerability, and wherein the vulnerability is associated with a severity factor that indicates criticality of the vulnerability;

determine, from the representations of configuration items in the persistent storage, a count of computing devices on which the software application is installed;

calculate a security threat score for the software application having the vulnerability, wherein the security threat score is at least based on the severity factor of the vulnerability and the count of computing devices;

provide, to a first entity associated with development of the software application, a first indication of the software application and the vulnerability; and provide, to a second entity associated with operation of the managed network, a second indication of the software application, the vulnerability, and the security threat score.

2. The system of claim 1, wherein obtaining results of the vulnerability analysis performed on the software application comprises obtaining results of a static or dynamic code analysis performed on source or object code of the software application, wherein the static or dynamic code analysis is performed by a third-party vulnerability detection tool that is integrated with the system.

3. The system of claim 1, wherein obtaining results of the vulnerability analysis performed on the software application comprises obtaining results of a vulnerability scan of the software application as deployed in the managed network, wherein the vulnerability scan is performed by a third-party vulnerability detection tool that is integrated with the system.

4. The system of claim 1, wherein the vulnerability is also associated with an exploitability factor that indicates a skill level required to exploit the vulnerability, and wherein the security threat score is also based on the exploitability factor.

5. The system of claim 4, wherein the security threat score is also based on an exposure factor that represents ease of access to exploiting the vulnerability.

6. The system of claim 1, wherein the security threat score is scaled by a multiplicative factor representing a logarithmic function that grows with the count of computing devices.

7. The system of claim 6, wherein the logarithmic function is based on a partial sum of a harmonic series up to the count of computing devices.

8. The system of claim 1, wherein the security threat score is also provided to the first entity.

9. The system of claim 1, wherein the first indication and the second indication take a form of email, text message, telephone call, or web-based graphical user interface.

10. The system of claim 1, wherein the one or more processors are further configured to:

calculate a service-level security threat score for a networked service provided by the managed network, wherein the networked service involves the software application having the vulnerability, wherein the networked service is defined by a set of the configuration items and relationships therebetween as indicated by the relationship data, and wherein the service-level security threat score is based on severity factors associated with the set of the configuration items.

11. A computer-implemented method comprising:

obtaining results of a vulnerability analysis performed on a software application discovered in a managed network, wherein the results indicate that the software application exhibits a vulnerability, wherein the vulnerability is associated with a severity factor that indicates criticality of the vulnerability, wherein persistent storage contains representations of configuration items discovered in the managed network, and wherein the configuration items include computing devices deployed within the managed network, software applications installed on the computing devices, and relationship data mapping the software applications to the computing devices on which they are installed;

determining, from the representations of configuration items in the persistent storage, a count of computing devices on which the software application is installed;

calculating a security threat score for the vulnerability, wherein the security threat score is at least based on the severity factor of the vulnerability and the count of computing devices;

providing, to a first entity associated with development of the software application, a first indication of the software application and the vulnerability; and providing, to a second entity associated with operation of the managed network, a second indication of the software application, the vulnerability, and the security threat score.

12. The computer-implemented method of claim 11, wherein obtaining results of the vulnerability analysis performed on the software application comprises obtaining results of a static or dynamic code analysis performed on source or object code of the software application, wherein the static or dynamic code analysis is performed by a third-party vulnerability detection tool that is integrated with a remote network management platform that is associated with the managed network.

13. The computer-implemented method of claim 11, wherein obtaining results of the vulnerability analysis performed on the software application comprises obtaining results of a vulnerability scan of the software application as deployed in the managed network, wherein the vulnerability scan is performed by a third-party vulnerability detection tool that is integrated with a remote network management platform that is associated with the managed network.

14. The computer-implemented method of claim 11, wherein the vulnerability is also associated with an exploitability factor that indicates a skill level required to exploit the vulnerability, and wherein the security threat score is also based on the exploitability factor.

15. The computer-implemented method of claim 14, wherein the security threat score is also based on an exposure factor that represents ease of access to exploiting the vulnerability.

16. The computer-implemented method of claim 11, wherein the security threat score is scaled by a multiplicative factor representing a logarithmic function that grows with the count of computing devices.

17. The computer-implemented method of claim 16, wherein the logarithmic function is based on a partial sum of a harmonic series up to the count of computing devices.

18. An article of manufacture including a non-transitory computer-readable medium, having stored thereon program instructions that, upon execution by a computing system, cause the computing system to perform operations comprising:

obtaining results of a vulnerability analysis performed on a software application discovered in a managed network, wherein the results indicate that the software application exhibits a vulnerability, wherein the vulnerability is associated with a severity factor that indicates criticality of the vulnerability, wherein persistent storage contains representations of configuration items discovered in the managed network, and wherein the configuration items include computing devices deployed within the managed network, software applications installed on the computing devices, and relationship data mapping the software applications to the computing devices on which they are installed;

determining, from the representations of configuration items in the persistent storage, a count of computing devices on which the software application is installed;

calculating a security threat score for the vulnerability, wherein the security threat score is at least based on the severity factor of the vulnerability and the count of computing devices;

providing, to a first entity associated with development of the software application, a first indication of the software application and the vulnerability; and providing, to a second entity associated with operation of the managed network, a second indication of the software application, the vulnerability, and the security threat score.

19. The article of manufacture of claim 18, wherein obtaining results of the vulnerability analysis performed on the software application comprises obtaining results of a static or dynamic code analysis performed on source or object code of the software application, wherein the static or dynamic code analysis is performed by a third-party vulnerability detection tool that is integrated with the computing system.

20. The article of manufacture of claim 18, wherein obtaining results of the vulnerability analysis performed on the software application comprises obtaining results of a vulnerability scan of the software application as deployed in the managed network, wherein the vulnerability scan is performed by a third-party vulnerability detection tool that is integrated with the computing system.

* * * * *